United States Patent
Bartels et al.

(10) Patent No.: US 10,724,516 B2
(45) Date of Patent: Jul. 28, 2020

(54) RECIPROCATING PISTON

(71) Applicant: FORUM US, INC., Houston, TX (US)

(72) Inventors: Heinrich Bartels, Houston, TX (US); Steven Post, Houston, TX (US)

(73) Assignee: FORUM US, INC., Houston, TX (US)

( * ) Notice: Subject to any disclaimer, the term of this patent is extended or adjusted under 35 U.S.C. 154(b) by 292 days.

(21) Appl. No.: 15/621,475

(22) Filed: Jun. 13, 2017

(65) Prior Publication Data

US 2018/0355865 A1 Dec. 13, 2018

(51) Int. Cl.
*F04B 53/14* (2006.01)
*F04B 47/00* (2006.01)
*F16J 9/20* (2006.01)
*F04B 1/00* (2020.01)
*F04B 53/08* (2006.01)

(52) U.S. Cl.
CPC .............. *F04B 53/143* (2013.01); *F04B 1/00* (2013.01); *F04B 47/00* (2013.01); *F04B 53/08* (2013.01); *F16J 9/20* (2013.01)

(58) Field of Classification Search
CPC .. F04C 15/0096; F04C 9/00; F04C 2210/147; F02M 59/025; F02M 59/027; F02M 59/02; F02M 59/442; F04B 19/22; F04B 53/14; F04B 53/143; F04B 39/041; F04B 39/042; F04B 39/06; F04B 47/00; F04B 1/00; F04B 53/08; F16J 9/12; F16J 9/20; F02B 55/04
USPC .......................................... 277/459, 464, 465
See application file for complete search history.

(56) References Cited

U.S. PATENT DOCUMENTS

| | | | | |
|---|---|---|---|---|
| 4,403,153 A | * | 9/1983 | Vallon | F01B 3/0079 123/46 E |
| 4,592,559 A | * | 6/1986 | Harvey | F04B 39/042 277/461 |
| 4,601,235 A | * | 7/1986 | Roberts | F04B 53/143 277/437 |
| 5,960,700 A | | 10/1999 | Staggs et al. | |
| 6,530,760 B1 | * | 3/2003 | Graber | F04B 39/0005 417/545 |
| 6,532,913 B1 | * | 3/2003 | Opris | F02B 75/20 123/193.6 |
| 6,957,605 B1 | * | 10/2005 | Blume | F04B 53/143 277/436 |
| 7,168,361 B1 | | 1/2007 | Blume | |
| 7,219,594 B2 | | 5/2007 | Kugelev et al. | |
| 7,913,508 B2 | | 3/2011 | Pu et al. | |
| 8,561,523 B2 | | 10/2013 | Riley et al. | |
| 2010/0074780 A1 | * | 3/2010 | Riley | F04B 53/143 417/437 |
| 2010/0295250 A1 | | 11/2010 | Liepold | |
| 2012/0138010 A1 | * | 6/2012 | Ulrey | F01M 1/08 123/196 R |
| 2013/0206095 A1 | * | 8/2013 | Azevedo | F16J 1/09 123/193.6 |

(Continued)

*Primary Examiner* — Devon C Kramer
*Assistant Examiner* — Christopher J Brunjes
(74) *Attorney, Agent, or Firm* — Patterson & Sheridan, L.L.P.

(57) ABSTRACT

A reciprocating piston of a positive displacement pump has a piston body with a plurality of cooling fins on one or more exterior surfaces of the piston body. A seal coupled to the piston body forms a seal with the walls of a cylinder in the positive displacement pump. A rod moves the piston within the cylinder to cause the displacement of fluid.

15 Claims, 2 Drawing Sheets

(56) References Cited

U.S. PATENT DOCUMENTS

| | | | |
|---|---|---|---|
| 2014/0260960 A1* | 9/2014 | Lapp | F16J 1/005 |
| | | | 92/186 |
| 2014/0369873 A1* | 12/2014 | Bassine | F04B 1/0413 |
| | | | 417/537 |
| 2016/0102596 A1* | 4/2016 | Vaden | F02B 23/0678 |
| | | | 123/41.35 |

\* cited by examiner

RECIPROCATING PISTON

BACKGROUND

Field

Embodiments of the disclosure relate to a reciprocating piston of a positive displacement pump. Specifically, embodiments of the disclosure relate to cooling fins on a reciprocating piston.

Description of the Related Art

Positive displacement pumps are often used to displace pressurized fluids. One example of a positive displacement pump is a mud pump, which is used in drilling operations to displace drilling fluid on a drilling rig. During operation of a positive displacement pump, a reciprocating piston of the pump reciprocates between two positions within the walls of a piston cylinder of the pump. The piston is comprised of a seal coupled to a piston body, which forms a seal between the piston and the walls of the cylinder. The repetitive reciprocating movement of the piston and the friction between the seal and the walls of the cylinder heats up the piston. If the piston becomes too hot during operation, the piston and/or the seal may fail and leak.

Therefore, there is a need for new and improved reciprocating pump pistons.

SUMMARY

In one embodiment, a piston assembly comprises a piston having a plurality of cooling fins formed on an exterior surface of the piston, and a seal coupled to the piston.

In one embodiment, a pump comprises a piston having a plurality of cooling fins formed on an exterior surface of the piston; a seal coupled to the piston; a cylinder, wherein the piston is disposed within the cylinder such that the seal forms a seal between the piston and the cylinder; and a piston rod coupled to the piston and configured to reciprocate the piston within the cylinder, wherein the pump is a positive displacement pump.

BRIEF DESCRIPTION OF THE DRAWINGS

The appended drawings illustrate only typical embodiments and are therefore not to be considered limiting of the scope of the disclosure.

DETAILED DESCRIPTION

Figure 1:
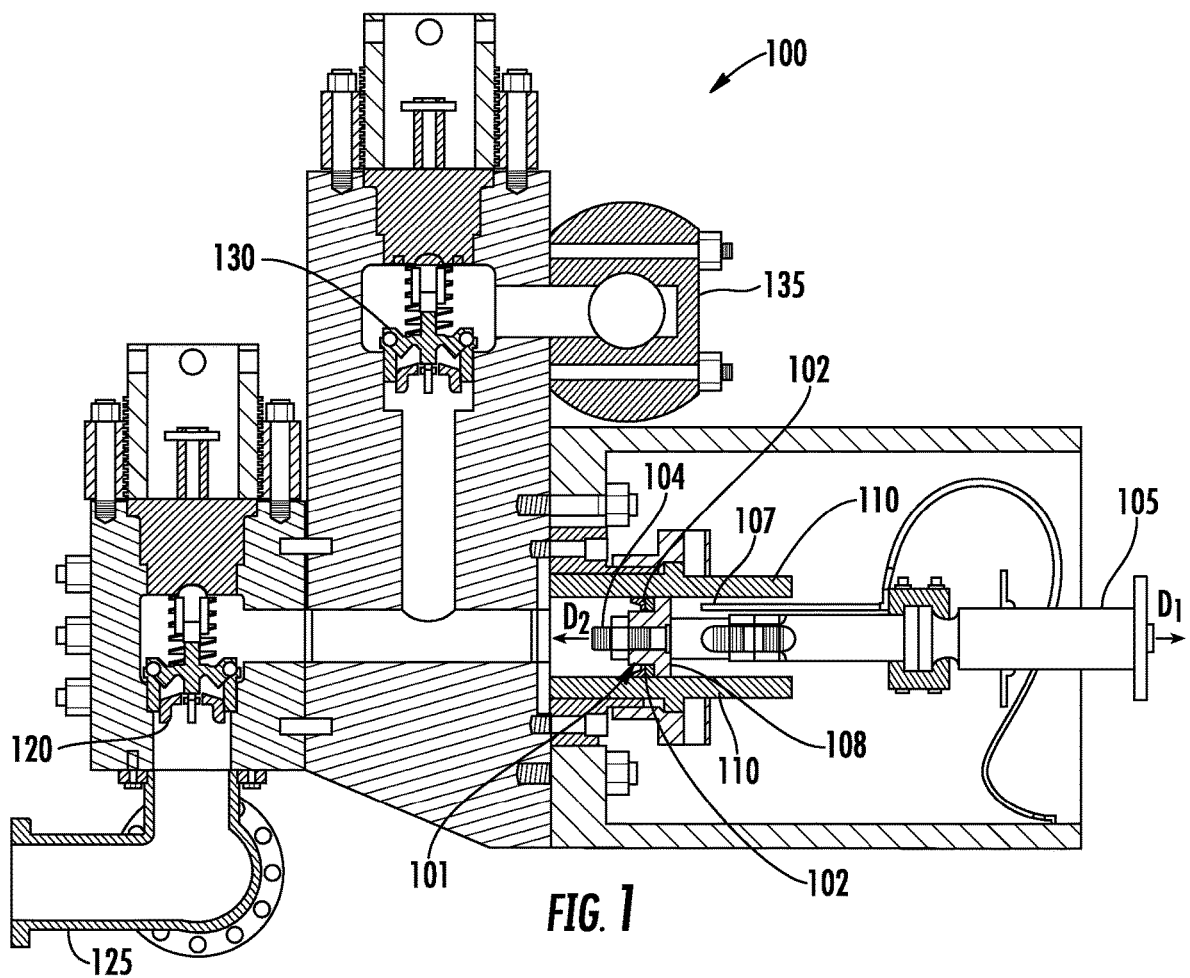
FIG. 1 shows a sectional view of a positive displacement pump according to one embodiment.

FIG. 1 shows an embodiment of a positive displacement pump 100. As described herein and shown in the drawings, the positive displacement pump 100 is a mud pump for drilling operations. However, the embodiments described herein are not limited to use with a mud pump, but may be used with other types of pumps with reciprocating pistons.

In FIG. 1, the pump 100 has a reciprocating piston 101 disposed within a piston cylinder 110. The piston 101 comprises a piston body 108 and a seal 102. The piston 101 is coupled to a piston rod 105 by a washer and threaded bolt 104 for example that is disposed through the piston 101. The seal 102 is coupled to the piston body 108 and forms a seal between the piston 101 and the inner wall of the cylinder 110. The piston 101 is moved back and forth within the cylinder 110 by the piston rod 105, which is driven by a power end, such as a crank shaft and motor assembly.

The piston 101 is reciprocated in a first direction identified by reference arrow D1, away from the pump 100, to draw fluid through a suction valve 120 from a suction manifold 125 that is in fluid communication with the piston 101. The piston 101 is reciprocated in a second, opposite direction identified by reference arrow D2, toward the pump 100, to pressurize and discharge the fluid through a discharge valve 130 to a discharge manifold 135 that is in fluid communication with the piston 101. A spray assembly 107 sprays a cooling and/or lubricating fluid, such as water, onto a backside of the piston body 108 during operation of the pump 100 to cool the piston 101.

Figure 2A:
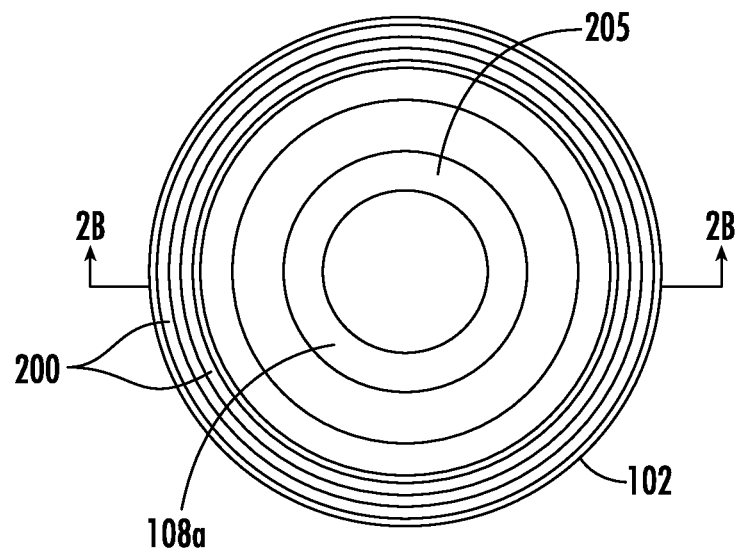
FIG. 2A shows a top view of a reciprocating piston according to one embodiment.
Figure 2B:
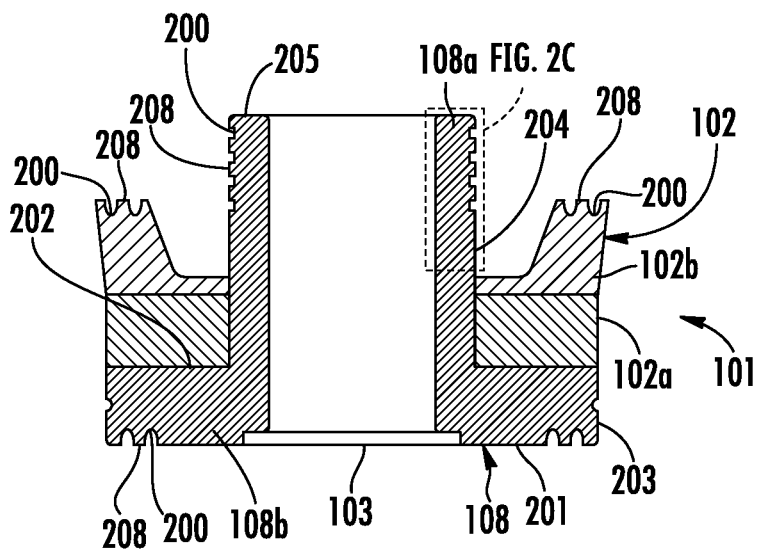
FIG. 2B shows a sectional view of the reciprocating piston of FIG. 2A.

FIG. 2A shows a top view of the piston 101 according to one embodiment. FIG. 2B shows a cross-section of the piston 101 along line 2B-2B shown in FIG. 2A. The piston body 108 has a bore 103 disposed through an upper cylindrical portion 108a and a lower cylindrical portion 108b. In alternative embodiments, the upper and lower portions 108a, 108b can be conical or other axisymmetric shapes. The lower cylindrical portion 108b has an outer diameter greater than an outer diameter of the upper cylindrical portion 108a. The lower cylindrical portion 108b of the piston body 108 has an exterior back surface 201, an exterior side surface 203, and an exterior front surface 202. The upper cylindrical portion 108a of the piston body 108 has an exterior side surface 204 and an exterior front surface 205.

The seal 102 is coupled to the piston body 108 and contacts both the exterior front surface 202 of the lower cylindrical portion 108b and the exterior side surface 204 of the upper cylindrical portion 108a. The seal 102 is comprised of a first portion 102a coupled to a second portion 102b. The first and/or second portions 102a, 102b of the seal 102 form a seal between the piston 101 and the inner wall of the cylinder 110 during operation.

In one embodiment, the piston body 108 is formed out of a metallic material, such as aluminum and/or steel. In one embodiment, the first portion 102a of the seal 102 is formed out of an elastomeric material, such as rubber or polyurethane. In one embodiment, the second portion 102b of the seal 102 is formed out of an elastomeric material, such as rubber or polyurethane. In one embodiment, the first portion 102a of the seal 102 is formed out of a material that is harder than the material of the second portion 102b.

The exterior surface of the seal 102, the exterior side surface 204 of the upper cylindrical portion 108a, and the exterior back surface 201 of the lower cylindrical portion 108b each have one or more cooling fins 208 formed in the surfaces between grooves 200. Although only shown on the exterior surface of the second portion 102b of the seal 102, and the exterior side surface 204 and the exterior back surface 201 of the piston body 108, the cooling fins 208 may be formed on any surface of the piston body 108 and/or the seal 102 that is exposed to a fluid to dissipate heat from the piston 101 and the seal 102. There may be any number of cooling fins 208 formed along surfaces of the piston body 108 and/or the seal 102, and the cooling fins 208 may be formed in any shape.

In one embodiment, the cooling fins 208 may be formed on only one exterior surface of the piston body 108 and/or the seal 102. In one embodiment, the cooling fins 208 may be formed on only the upper cylindrical portion 108a. In one embodiment, the cooling fins 208 may be formed on only the lower cylindrical portion 108b. In one embodiment, one or more of the cooling fins 208 may protrude outward from the surfaces of the piston 101 and/or the seal 102 such that they are raised from the surfaces of the piston 101 and/or the seal 102.

Figure 2C:
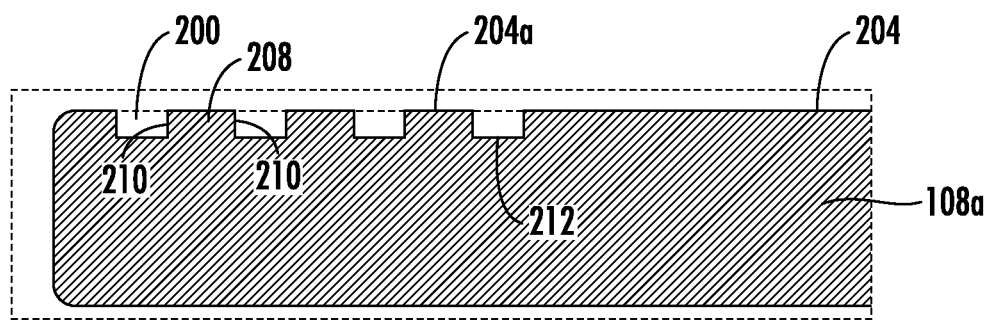
FIG. 2C shows an enlarged sectional view of a portion of the reciprocating piston head of FIG. 2B.

FIG. 2C shows an enlarged view of the upper cylindrical portion 108a of the piston 108 of FIG. 2B. The cooling fins 208 and the grooves are disposed along the exterior side surface 204 of the upper cylindrical portion 108a of the piston body 108. Each cooling fin 208 has two side surfaces 210 and a top surface 204a that is substantially flush with the exterior side surface 204 of the upper cylindrical portion 108a. Each groove 200 has a bottom surface 212 that forms at least part of one of the side surfaces 210 of at least one cooling fin 208.

The additional surface area created by the side surfaces 210 of the cooling fins 208 and the bottom surfaces 212 of the grooves is greater than and helps dissipate more heat away from the piston 101 during operation than the surface area of the exterior side surface 204 with no cooling fins 208 as shown by the dashed line in FIG. 2C. Similarly, in one embodiment where there are no grooves 200, and the cooling fins 208 protrude outward and are raised from the surface 204, the additional surface area of the side surfaces 210 of the cooling fins 208 is greater than and helps dissipate more heat away from the piston 101 during operation than the surface area of the exterior side surface 204 with no cooling fins 208 as shown by the dashed line in FIG. 2C. The increased surface area resulting from the cooling fins 208 results in increased heat dissipation during operation and a decrease in the temperature of the piston 101 during operation.

While the foregoing is directed to some embodiments, other and further embodiments may be devised without departing from the basic scope thereof, and the scope thereof is determined by the claims that follow.

The invention claimed is:

1. A piston, comprising:
a piston body, the piston body comprising:
an upper cylindrical portion comprising an outer exterior side surface, an exterior front surface, and a maximum outer diameter;
a lower cylindrical portion comprising an exterior side surface, an exterior front surface, an exterior back surface, and a maximum outer diameter that is greater than the maximum outer diameter of the upper cylindrical portion;
a first set of one or more cooling fins disposed on the outer exterior side surface of the upper cylindrical portion, and
a second set of one or more cooling fins disposed on the exterior back surface of the lower cylindrical portion;
a bore disposed through the piston body; and
a seal coupled to the piston body, the seal comprising:
a first portion in contact with the exterior front surface of the lower cylindrical portion;
a second portion coupled to the first portion; and
one or more cooling fins disposed on an exterior surface of the second portion, wherein the exterior surface of the second portion faces away from the exterior back surface of the lower cylindrical portion of the piston body.

2. The piston of claim 1, wherein at least one groove is formed in the exterior side surface of the lower cylindrical portion.

3. The piston of claim 1, wherein:
each one of the cooling fins of the first set disposed on the outer exterior side surface of the upper cylindrical portion is located between two grooves formed in the outer exterior side surface of the upper cylindrical portion; and
each one of the cooling fins of the second set disposed on the exterior back surface of the lower cylindrical portion is located between two grooves formed in the exterior back surface of the lower cylindrical portion.

4. The piston of claim 1, wherein the piston body is formed out of a metallic material.

5. The piston of claim 4, wherein the metallic material is aluminum.

6. The piston of claim 1, wherein the first portion of the seal is formed out of a material that is harder than a material of the second portion of the seal.

7. The piston of claim 6, wherein each of the one or more cooling fins disposed on the exterior surface of the second portion of the seal has a surface between two grooves formed in the exterior surface of the second portion of the seal.

8. The piston of claim 1, wherein the bore is disposed through the lower cylindrical portion and the upper cylindrical portion.

9. A pump, comprising:
a piston comprising:
an upper cylindrical portion comprising an outer exterior side surface and a maximum outer diameter;
a lower cylindrical portion comprising an exterior front surface, an exterior back surface, and a maximum outer diameter that is greater than the maximum outer diameter of the upper cylindrical portion; and
a plurality of cooling fins formed on the outer exterior side surface of the upper cylindrical portion;
a seal coupled to the piston, the seal having one or more cooling fins, each of the one or more cooling fins having a surface between two grooves formed in an exterior surface of the seal;
a cylinder, wherein the piston is disposed within the cylinder such that the seal forms a seal between the piston and the cylinder; and
a piston rod coupled to the piston and configured to reciprocate the piston within the cylinder, wherein the pump is a positive displacement pump.

10. The pump of claim 9, further comprising a spray assembly configured to spray a cooling or lubricating fluid on a backside of the piston.

11. The pump of claim 10, further comprising a suction valve and a suction manifold in fluid communication with the piston.

12. The pump of claim 11, further comprising a discharge valve and a discharge manifold in fluid communication with the piston.

13. The pump of claim 12, wherein the piston is movable in a first direction to draw fluid through the suction valve from the suction manifold and movable in a second, opposite direction to discharge the fluid through the discharge valve to the discharge manifold.

14. The pump of claim 9, wherein the piston further comprises one or more cooling fins disposed on the exterior back surface of the lower cylindrical portion of the piston.

15. The pump of claim 9, wherein the piston further comprises a bore disposed through the lower cylindrical portion and the upper cylindrical portion.

\* \* \* \* \*